Figure 2:
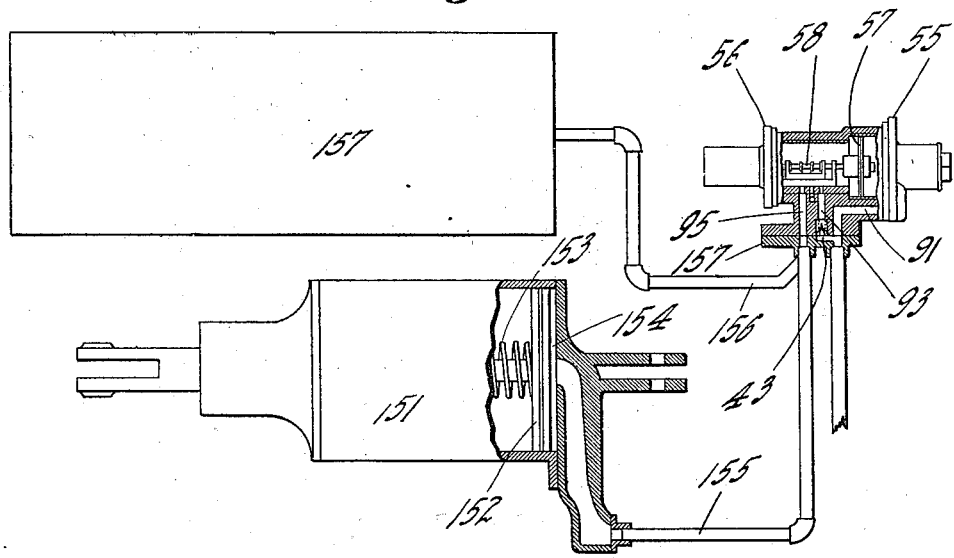

A. A. ST. CLAIR.
AIR BRAKE.
APPLICATION FILED MAR. 29, 1909.
976,224.
Patented Nov. 22, 1910.
9 SHEETS—SHEET 1.
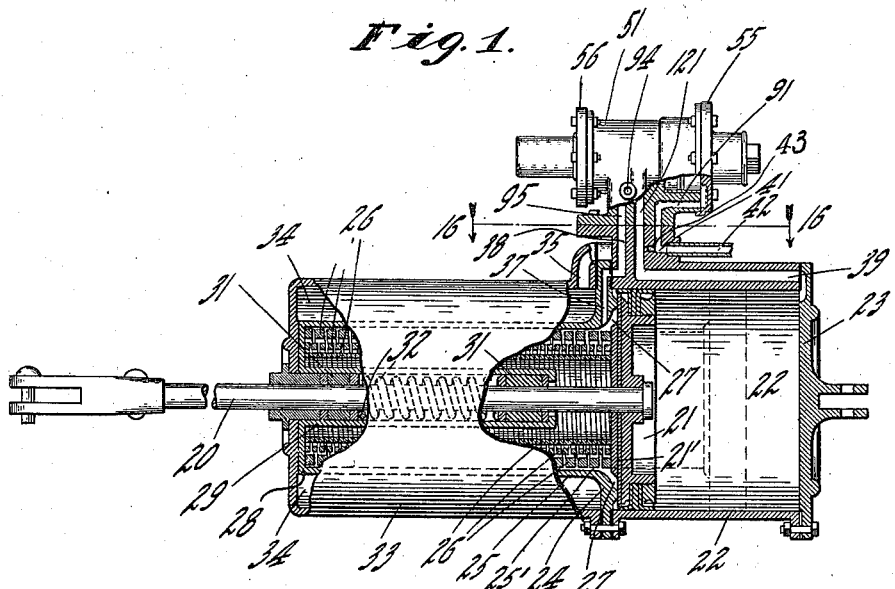
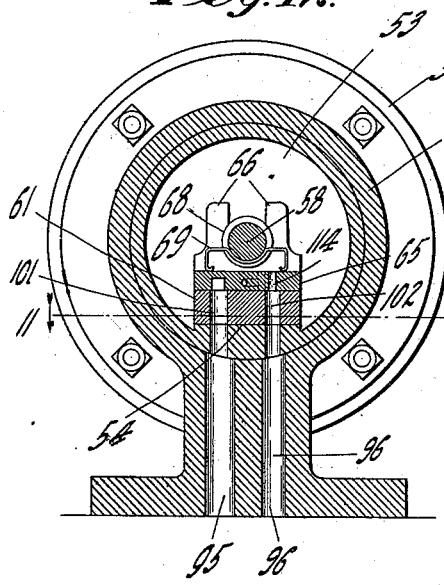
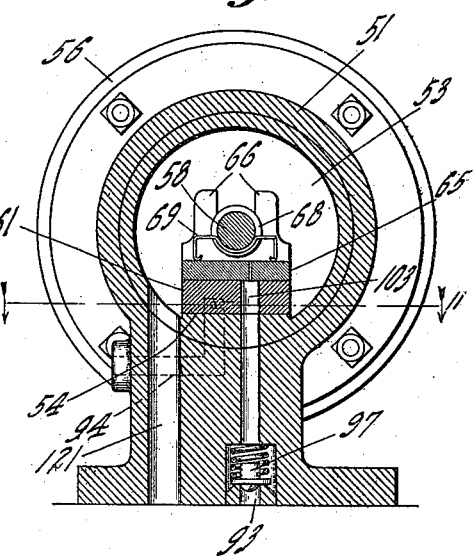
Witnesses
Frank A. Fahle
Thomas W. McMeans
Inventor
Augustus A. St. Clair,
By Bradford Hood
Attorneys

A. A. ST. CLAIR.
AIR BRAKE.
APPLICATION FILED MAR. 29, 1909.

976,224.

Patented Nov. 22, 1910.
9 SHEETS—SHEET 2.

Witnesses
Frank A. Fahl
Thomas W. McMeans

Inventor
Augustus A. St. Clair,
By Bradford Hood
Attorneys

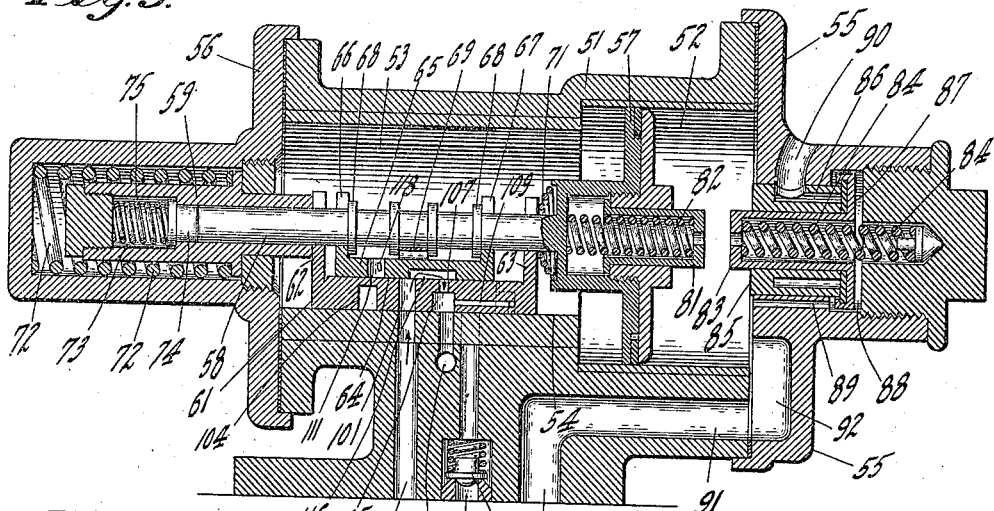
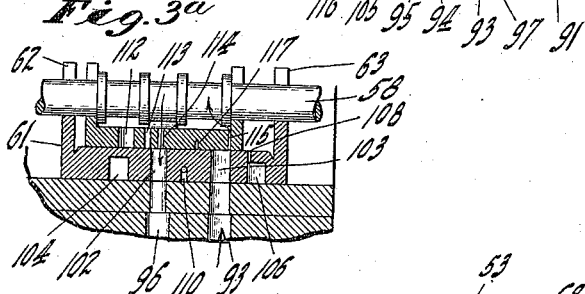
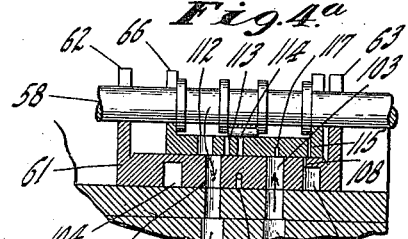
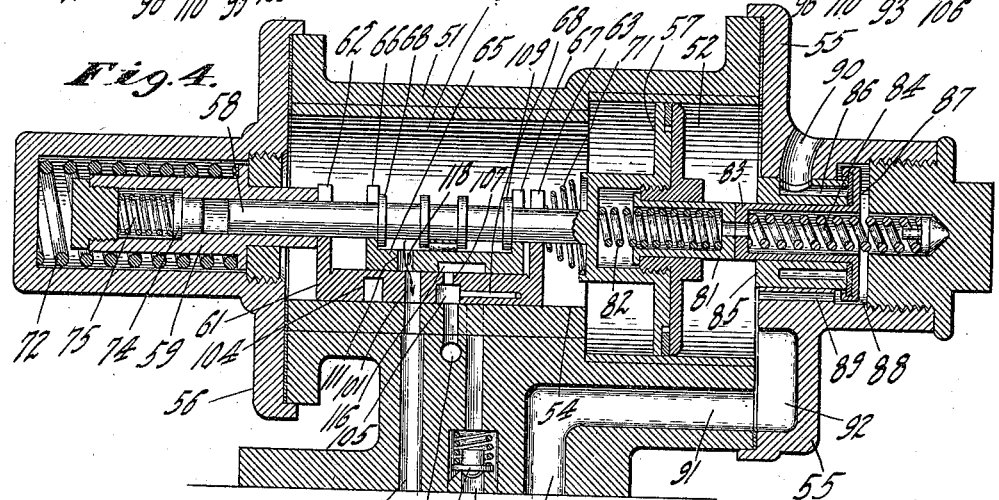

A. A. ST. CLAIR.
AIR BRAKE.
APPLICATION FILED MAR. 29, 1909.
976,224.
Patented Nov. 22, 1910.
9 SHEETS—SHEET 4.
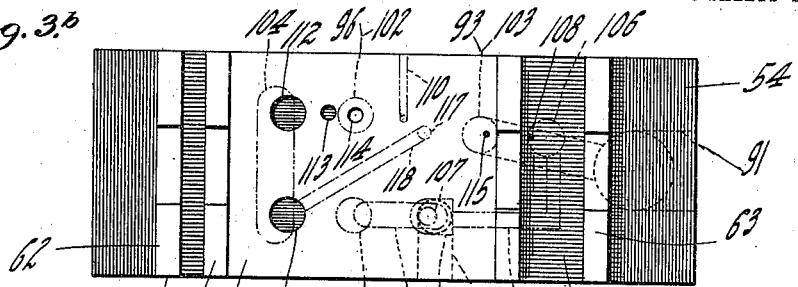
Fig. 3.b
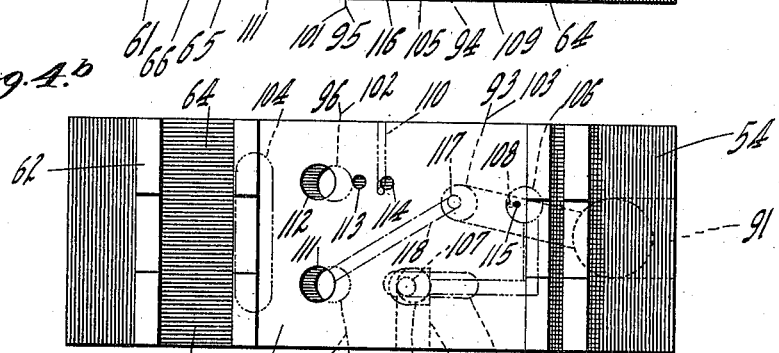
Fig. 4.b
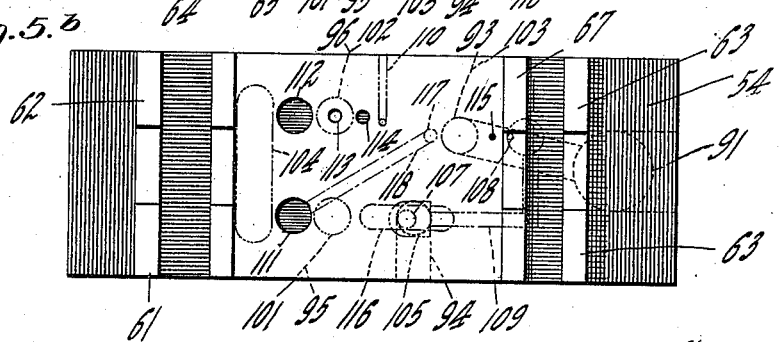
Fig. 5.b
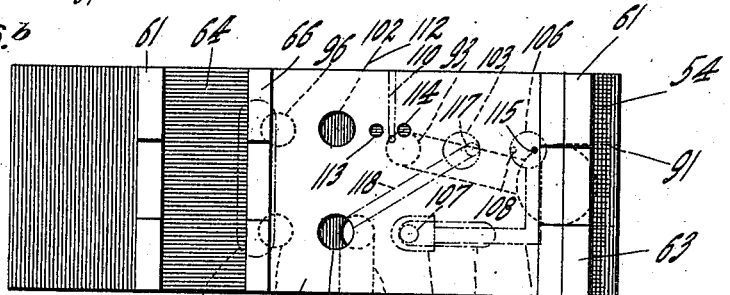
Fig. 6.b
Witnesses
Frank A. Fahle
Thomas W. McMeans
Inventor
Augustus A. St. Clair
By Bradford Hood
Attorneys A. A. ST. CLAIR.
AIR BRAKE.
APPLICATION FILED MAR. 29, 1909.
976,224. Patented Nov. 22, 1910.
9 SHEETS—SHEET 5.
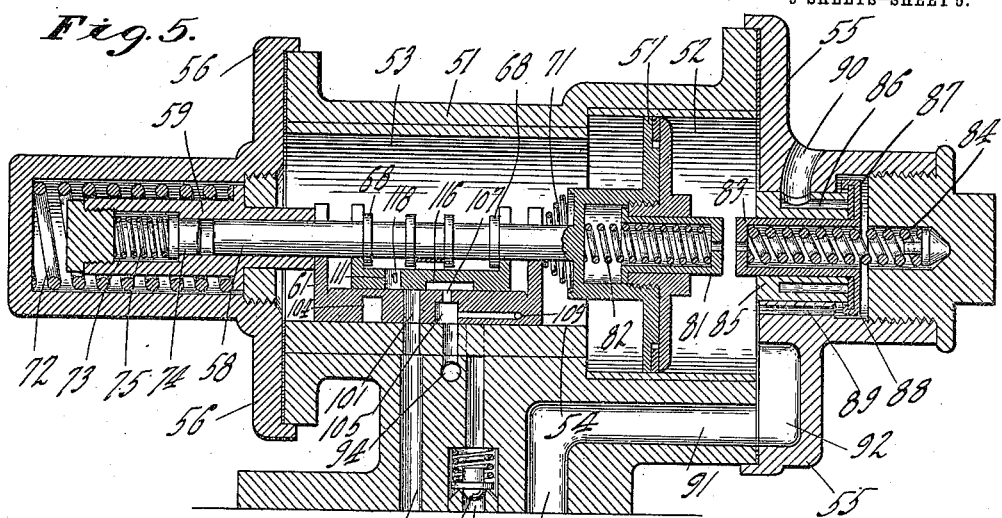
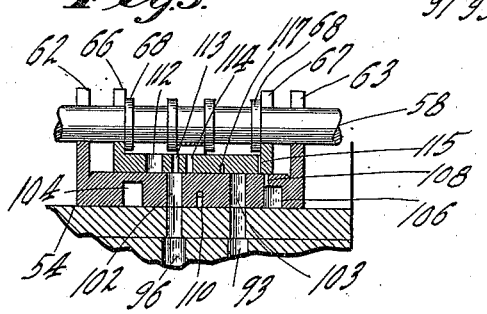
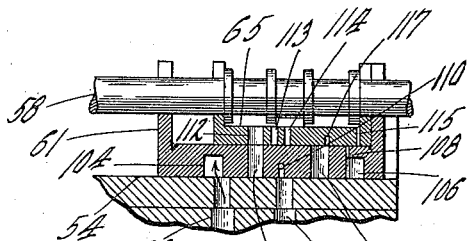
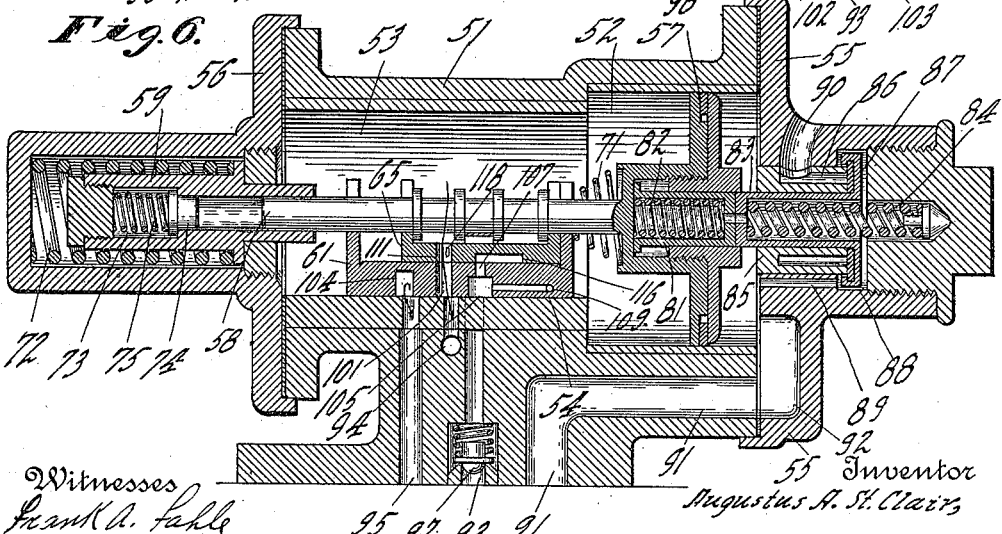
Witnesses
Frank A. Fahle
Thomas W. McMeans
Inventor
Augustus A. St. Clair,
By Bradford Ashood
Attorneys A. A. ST. CLAIR.
AIR BRAKE.
APPLICATION FILED MAR. 29, 1909.
976,224.
Patented Nov. 22, 1910.
9 SHEETS—SHEET 6.
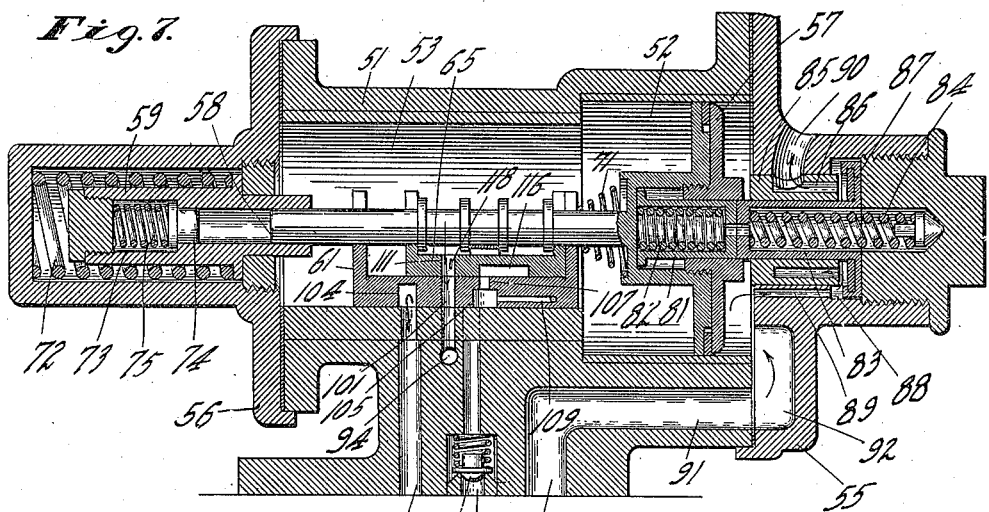
Fig. 7.
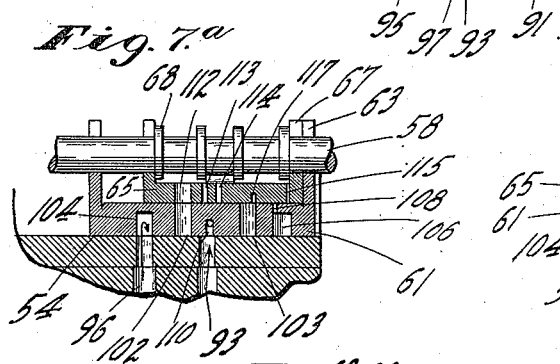
Fig. 7.ᵃ
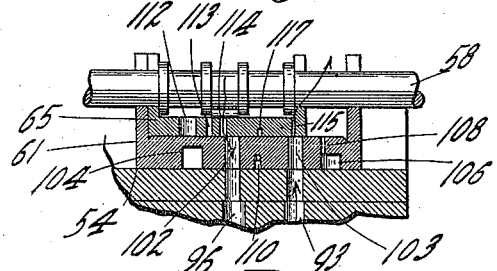
Fig. 8.ᵃ
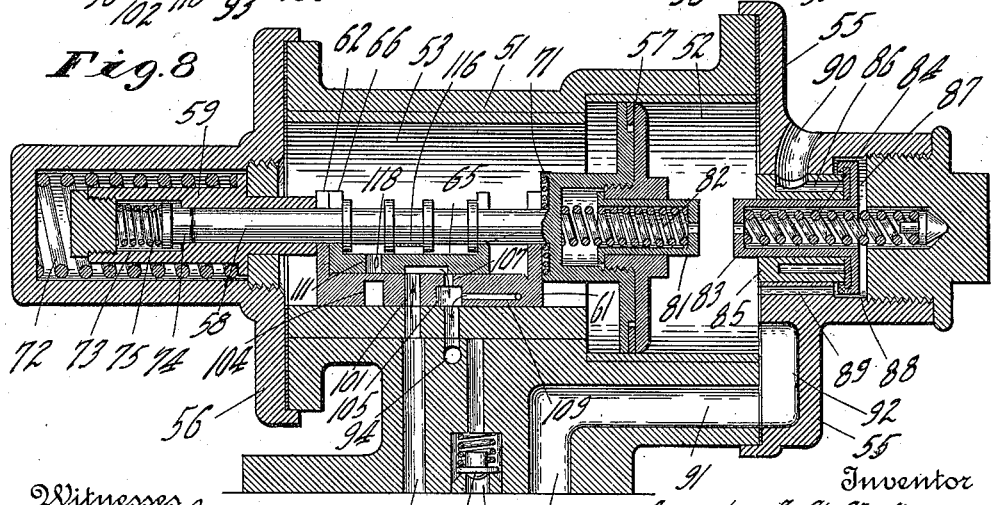
Fig. 8.
Witnesses
Frank A. Fahl
Thomas W. McMeans
Inventor
Augustus A. St. Clair,
By Bradford Wood
Attorneys A. A. ST. CLAIR.
AIR BRAKE.
APPLICATION FILED MAR. 29, 1909.
976,224.
Patented Nov. 22, 1910.
9 SHEETS—SHEET 7.
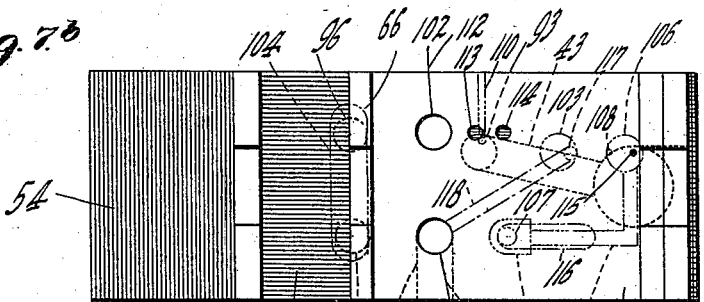
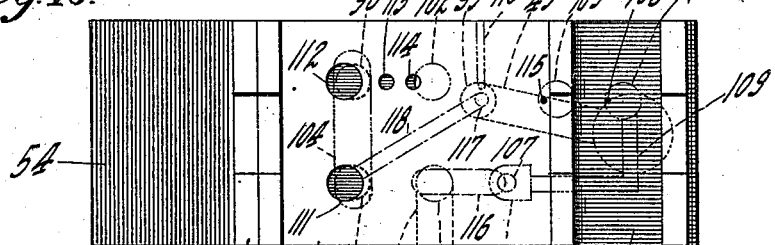
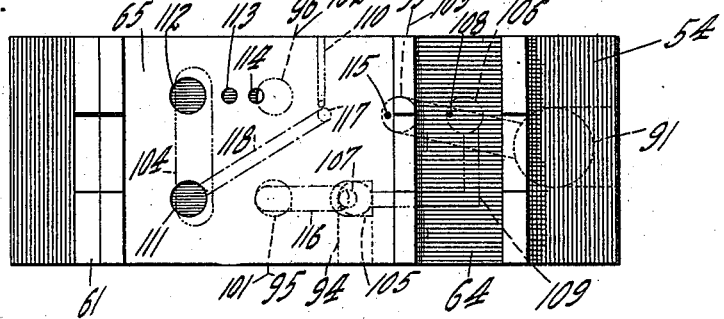
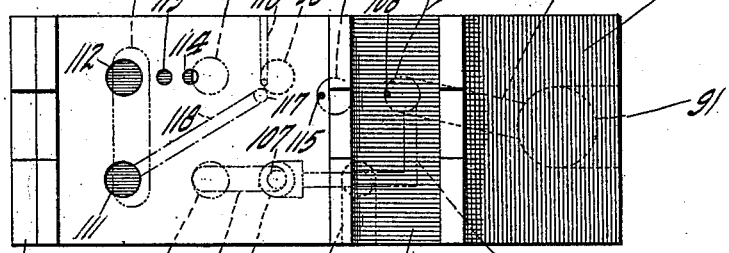

A. A. ST. CLAIR.
AIR BRAKE.
APPLICATION FILED MAR. 29, 1909.
976,224.
Patented Nov. 22, 1910.
9 SHEETS—SHEET 8.
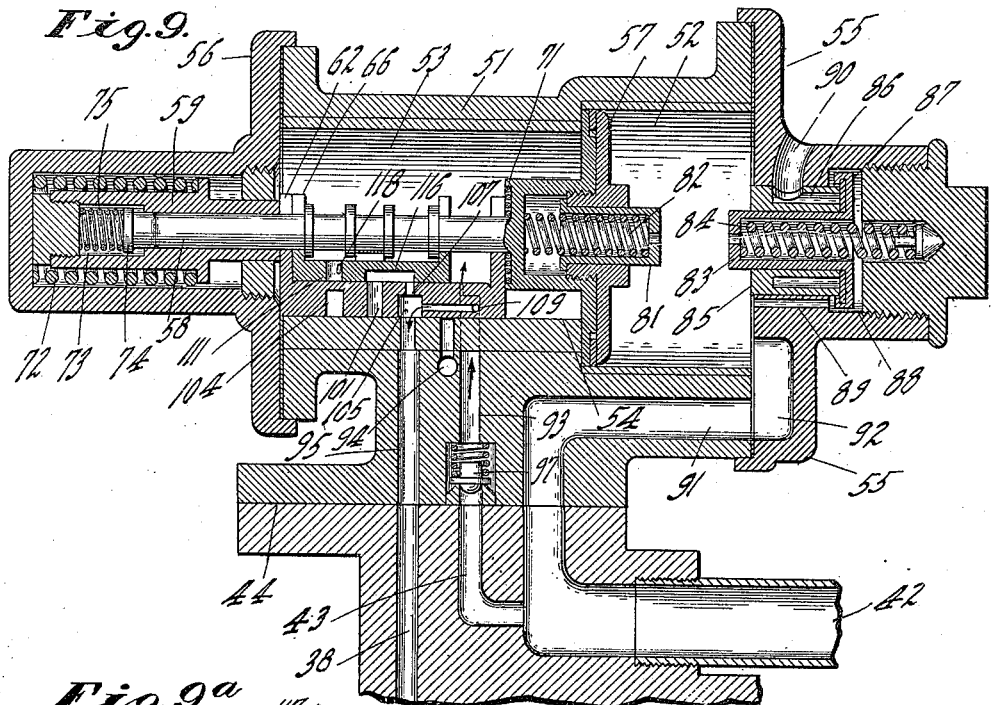
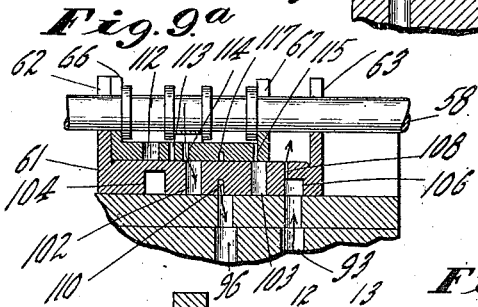
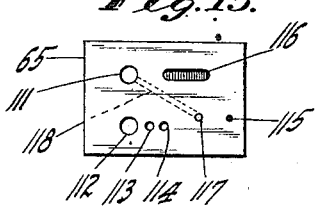
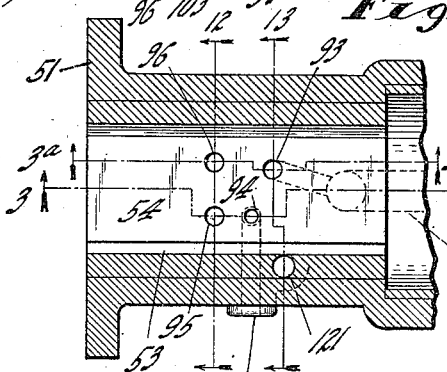
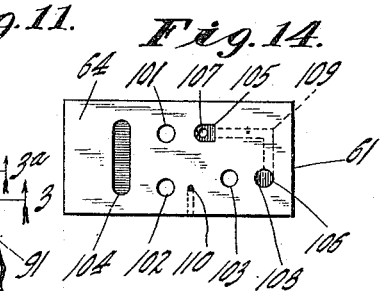
Witnesses
Frank A. Fahle
Thomas W. McMeans
Inventor
Augustus A. St. Clair
By Bradford Hood
Attorneys A. A. ST. CLAIR.
AIR BRAKE.
APPLICATION FILED MAR. 29, 1909.
976,224.
Patented Nov. 22, 1910.
9 SHEETS—SHEET 9.
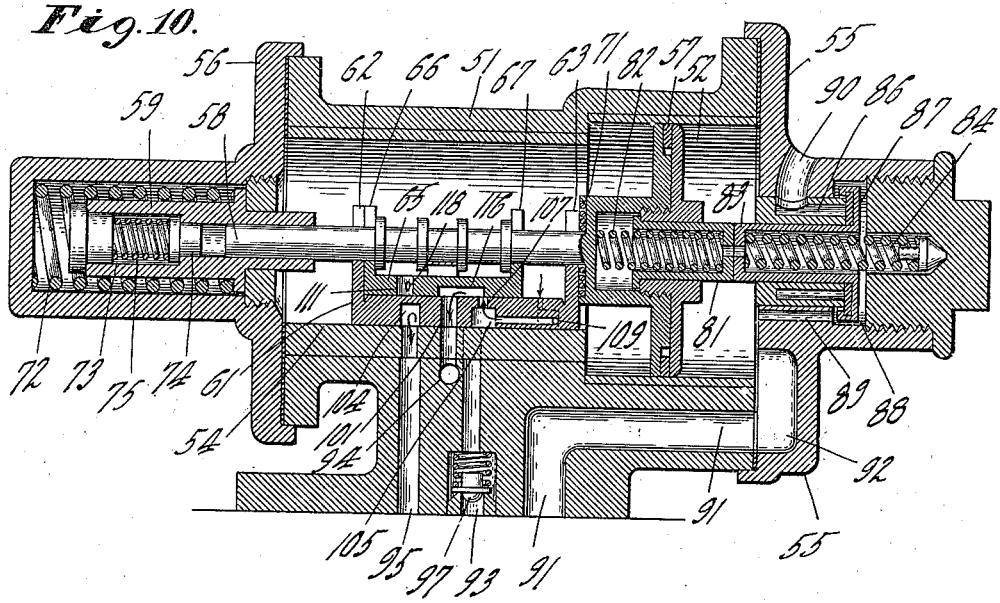
Fig. 10.
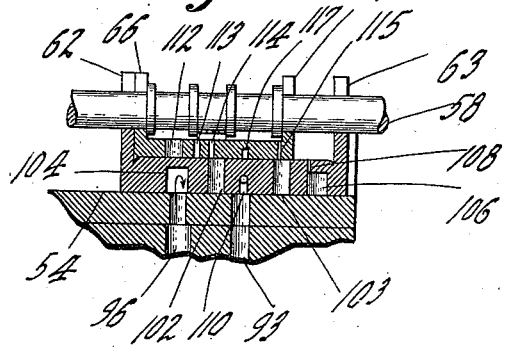
Fig. 10ª.
Witnesses
Frank A. Fahl
Thomas W. McMeans
Inventor
Augustus A. St. Clair,
By Bradford Hord
Attorneys

UNITED STATES PATENT OFFICE.

AUGUSTUS A. ST. CLAIR, OF INDIANAPOLIS, INDIANA, ASSIGNOR TO ST. CLAIR AIR BRAKE COMPANY, OF INDIANAPOLIS, INDIANA, A CORPORATION OF INDIANA.

AIR-BRAKE.

976,224.   Specification of Letters Patent.   Patented Nov. 22, 1910.

Application filed March 29, 1909. Serial No. 486,472.

*To all whom it may concern:*

Be it known that I, AUGUSTUS A. ST. CLAIR, a citizen of the United States, residing at Indianapolis, in the county of Marion and State of Indiana, have invented certain new and useful Improvements in Air-Brakes, of which the following is a specification.

In the operation of air brakes it is, at the present time, so far as I am aware, impossible to recharge the auxiliary reservoirs during the time of application of the brakes it being necessary, before there can be any recharging of the auxiliary reservoirs, that the brakes be released. In mountainous countries where there are long down grades it is practically impossible to maintain the brakes throughout the entire time of travel of the down grade, owing to unavoidable leakages, etc., especially where the brake apparatus has been in use for any considerable time, and many accidents have occurred by reason of the failure of the air. The same is true in suburban traffic where many brake applications are required within a short time. To some extent this difficulty was overcome by the brake forming the subject-matter of my Patent No. 860,946 wherein the material portion of the braking power is obtained from a spring which, in the total absence of air from the system will necessarily apply a material braking force. Even in this apparatus, however, air leakages would prevent the long continued application of the maximum braking force and it was impossible to recharge the system except after the brakes were released.

The primary object of my invention therefore is to provide a mechanism applicable either to the present standard air brake systems commonly known as the "Westinghouse" and "New York" or to the air brake shown in my previous patent above mentioned, by which brakes may be applied either from air pressure obtained from the auxiliary reservoirs on the individual cars or from the main reservoir carried by a tender, so that, while the brakes are applied by reason of direct pressure from the main reservoir, the auxiliary reservoirs will be recharged.

A further object of my invention is to produce a valve mechanism of such character that, without material waste of air, pressure may be practically wholly withdrawn from the valve side of the main valve piston so that comparatively slight train line pressure will serve to drive the valves to initial positions, thus increasing the speed and ease with which the valves may be controlled by the engineer.

A further object of my invention is to so form the valve mechanism that it will be especially applicable to brakes of the type shown in my above mentioned patent in conjunction with a supplemental reservoir which will normally serve to increase the working capacity of the chamber in which air is introduced to neutralize the force of the braking spring, the valve structure being such however as to prevent waste of air in the supplemental reservoir at the time when air is exhausted from the main chamber and thus withdrawn from resisting effect upon the braking spring.

A further object of my invention is to provide such improvements in details of construction as may be hereinafter pointed out.

The accompanying drawings illustrate my invention.

Figure 16:
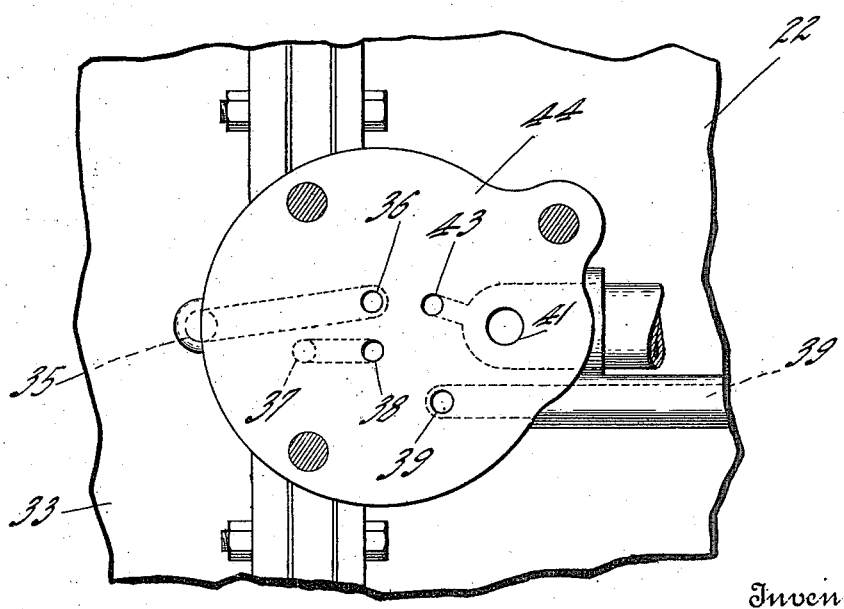

Figure 1 is a partial sectional view of my improved brake of the type illustrated in my above mentioned Letters Patent; Fig. 2 a similar view, somewhat diagrammatic, of a "Westinghouse" brake provided with my improved valve, the valve being the same as that shown in Fig. 1; Fig. 3 a sectional detail of my improved valve showing the parts in charging position, *i. e.*, in the position occupied under normal conditions when air can be forced from the train line into the storage reservoirs; Figs. 4, 5, 6, 7, 8, 9 and 10 are views similar to Fig. 3 with the parts in positions of first service, applied running, second service, emergency, retarded release, straight air, and emergency running, respectively, said Figs. 3 to 10 inclusive being sections on line 3 3 of Fig. 11. Figs. 3ª to 10ª inclusive are fragmentary sections on line 3ª 3ª of Fig. 11 showing the valves in the positions occupied in Figs. 3 to 10 inclusive. Figs. 3ᵇ to 10ᵇ inclusive are plans, practically full size, of the valve seat, the main valve and the riding valve, in the positions occupied respectively in Figs. 3 to 10 and 3ª to 10ª inclusive. Fig. 11 a section on line 11 11 of Figs. 12 and 13 with the main valve and riding valve omitted; Figs. 12 and 13 sections on lines 12 12 and 13 13 respectively of Fig. 11; Fig. 14 a plan of the under face of the main valve; Fig. 15 a plan of the under face of the riding valve, and Fig. 16 a plan on line 16 16 of Fig. 1.

For convenience in description I shall first take up the application of my improved valve to my own improved brake of the type shown in my above mentioned patent it being understood however that the structure is also applicable, as will appear later, to either the "New York" or "Westinghouse" brakes without change, although some of the ports of the valve, as designed for my type of brake, are not used when the valve is applied to the "New York" or "Westinghouse" brakes.

In the drawings, (Fig. 1) 20 indicates the brake rod provided on its inner end with a piston 21 which is mounted within a cylindrical chamber 22 and packed so as to be tight in both directions. Cylinder 22 has one of its ends closed by a head 23 and its other end is closed by a head 24 which carries a cylinder 25 of a diameter considerably smaller than the diameter of cylinder 22. Mounted in chamber 25' within cylinder 25 are nested compression springs 26 which tend to normally drive the piston 21 to the right (Fig. 1) i. e., toward brake applying position. The head 24 is provided with ports 27 which lead into cylinder 22 and piston 21 is provided with a face packing 21' which, when the piston is in the position shown in Fig. 1 (the position when the brakes are not applied) closes the open ends of ports 27. The outer end of cylinder 25 is closed by a head 28 which is conveniently integral with cylinder 25 and carries a central shell 29 which lies within the smallest one of the springs 26 and carries suitable packing 31 which surrounds the brake rod 20, a spring 32 forming an intermediate part of the packing 31 so as to keep the packing under constant compression thereby preventing leakage of air from spring chamber 25'. Sleeved over cylinder 25 is a cylinder 33 one end of which is closed and the open end of which is bolted against head 24 thus forming an auxiliary reservoir 34 provided with an inlet and outlet passage 35 which communicates with a passage 36 formed in the shell of cylinder 22. Formed in head 24 is a passage 37 which connects with a passage 38 in the wall of cylinder 22 and gives access to the spring chamber 25' within cylinder 25. Formed in the wall of cylinder 22 is a passage 39 which leads to the right hand end of cylinder 22. Also formed in the wall of cylinder 22 is a train line passage 41 to which the train line 42 is connected, and connected with the passage 41 is a passage 43, the purpose of which will appear. The passages 37, 38, 39, 41, and 43 emerge at different points in a face 44 to which my improved valve structure is to be bolted.

My improved valve structure comprises a main casing 51 within which is formed a piston chamber 52 and a valve chamber 53, the valve chamber communicating with one end of the piston chamber and having a valve seat 54 formed in its bottom. The outer end of piston chamber 52 is closed by a head 55 and the outer end of the valve chamber 53 is closed by a head 56. Mounted within piston chamber 52 is a valve-operating piston 57 which is packed so as to be tight in both directions and is provided with a stem 58 which is supported, at its end most distant from the piston, in a bushing 59 mounted in head 56. Seated upon the valve seat 54 is the main sliding valve 61 provided with a pair of fingers 62 and 63 at its opposite ends. The upper surface 64 of the valve 61 forms a seat for the valve 65 which, for convenience, I have called a riding valve, and this riding valve is provided at its opposite ends with fingers 66 and 67 which play between and are adapted to engage the fingers 62 and 63 respectively of the main valve 61. Valve stem 58 passes freely through the fingers 62, 66, 67, and 63 and is provided with a pair of collars 68, 68 which fit snugly between fingers 66 and 67 so that the riding valve 65 will partake of any and all of the longitudinal movements of the piston stem 58. A spring 69 arranged between the piston stem 58 and the riding valve 65 serves to hold the riding valve and the main valve upon their seats. A very light spring 71 is arranged between piston 57 and finger 63 in order to prevent the riding valve from shifting the main valve except by positive engagement. The bushing 59 is yieldable against the action of piston 57 but is normally held in the position shown in Fig. 3 by means of a spring 72 which may conveniently have a strength of about equal to 10 lbs. to the square inch of piston 57. Formed within bushing 59 is a chamber 73 within which is mounted an abutment 74 against which the outer end of piston stem 58 is adapted to lie when the parts are in charging position (Fig. 1) the abutment 74 being yieldably held in that position by means of a spring 75 which should be considerably lighter than spring 72 and may in practice be equal to about five lbs. per square inch of the area of piston 57.

Mounted centrally in piston 57 is a gage plunger 81 which is normally projected from the face of piston 57 by means of a spring 82 which may in practice have a force equal to about 6 lbs. per square inch of the area of piston 57. Mounted in head 55 is a gage plunger 83 which lies in the path of movement of the plunger 81 and is normally projected into the piston chamber 52 by a spring 84 which must be stronger than spring 82. In practice I find it to be convenient to make the spring 84 about equal to 12 lbs. per square inch. The plunger 83 is fitted within a bushing 85 provided with an annular passage 86 the entrance end of which is normally closed by a valve head 87 carried by the gage plunger 83. Valve 87 lies within a chamber 88 which is in free communication, by means of passages 89, with the train line side of piston chamber 52. Passage 86 is in free communication with the atmosphere through a passage 90.

Formed in main body 51 is a passage 91 which, at one end, communicates with the train line passage 41 and at the other end communicates with a passage 92 formed in head 55 and leading into the train line side of the piston chamber 52. Also formed in main body 51 is a passage 93 which, at one end, communicates with passage 43 and at the other end opens into the valve seat 54. Also formed in valve seat 54 are the following passages; 94, leading to atmosphere; 95 communicating with passage 38 and thus communicating through passage 37 with the spring chamber 25'; and 96, which communicates with passage 36 and through passage 35, with the auxiliary reservoir 34. An inwardly opening check valve 97 is mounted in passage 93 so that the only direction of flow through passage 93 will be into the valve chamber 53. Extended through the main valve 61 are passages 101, 102 and 103. Formed in the under face of valve 61 are pockets 104, 105 and 106 which extend only partly through the thickness of the valve, but continuing through the valve in pocket 105 is a passage 107 and continuing through the valve from pocket 106 is a small feed port 108. Pockets 105 and 106 are connected by a passage 109 which runs through the body of valve 61 between the upper and lower faces thereof. A passage 110 leads from the under face of valve 61 to one side thereof.

Extending through the riding valve 65 are passages 111, 112, 113, 114, and a small feed passage 115. The passages 112, 113, 114, might, if desired, be merged into one passage but, in order to retain as much surface as possible on the under face of valve 65, I prefer to make them separate as shown. Formed in the under face of valve 65 are two pockets 116 and 117 and pocket 117 communicates with passage 111 by a passage 118 which extends through the body of the valve. A passage 121 is formed in the main body 51 and leads up into the valve chamber 53 alongside of valve seat 54 and this passage 121 connects with passage 39.

Assuming a car of the train to be equipped with my improved brake structure as shown in Fig. 1, and the engine to be equipped with the usual main reservoir, pump and engineer's valve, and the train line to be connected to passage 41, the operation is as follows: Starting with the parts in the positions shown in Figs. 3, 3ª and 3ᵇ, air from the train line if admitted slowly, will pass into the train line side of chamber 52 but will also pass through passages 93, 103, and 115 into valve chamber 53 and pass from thence through passages 121 and 39 into chamber 22 and also through passages 114, 102, 96, 36 and 35 into the auxiliary reservoir 34 so that ultimately there will be in auxiliary reservoir 34, chamber 22, valve chamber 53 and piston chamber 52 a pressure equal to the train line pressure and piston 21 will be driven, against the action of springs 26, to the position shown in Fig. 1, where the brakes will have been released. In this condition the air pressures upon the two sides of the valve piston 57 will be equal. If an ordinary service application of the brakes is required the engineer will move his valve to service position and make about a 5 lb. reduction in the train line, thus causing piston 57 to travel to the position indicated in Fig. 4, further movement of the piston being resisted by the gage plungers 81 and 83. Valve 61 does not move during this operation (spring 71 insuring this) but riding valve 65 shifts almost to the limit of its movement relative to valve 61, bringing passages 111 and 112 about half-way over passages 101 and 102 respectively of the valve 61, and bringing pocket 117 into register with passage 103 so that communication is established through passage 118, between passages 101 and 103. By this movement the following connections will be made:— Chamber 22 is continuously in communication with valve chamber 53 by means of passages 39 and 121; auxiliary reservoir 34 is in communication with valve chamber 53 through passages 35, 36, 96, 102, and 112. Consequently air may flow from chamber 22 and auxiliary reservoir 34 into valve chamber 53 and thence through passages 111, 101, 95, 38 and 37 into spring chamber 25' until the pressure within chamber 25' and valve chamber 53 is very slightly less than the reduced train line pressure, whereupon piston 57 will move to the position shown in Fig. 5 thus carrying the riding valve 65 back to the position shown in Figs. 5, 5ª and 5ᵇ. This movement closes passage 101, and thus retains within the spring chamber 25' the air which is passed thereto and, because there has been a reduction of pressure within chamber 22, piston 21 will move to the right (Fig. 1) so as to set the brake with a pressure equal to the difference between the spring pressure plus the air pressure in chamber 25', and the pressure within chamber 22. A further braking force may be obtained by a further reduction of train line pressure, whereupon piston 57 and the riding valve 65 will again move to the position shown in Figs. 4, 4ª and 4ᵇ, thus permitting a further movement of air from chamber 22 and auxiliary reservoir 34 into the spring chamber 25', the riding valve being carried back to the position shown in Fig. 5 as soon as the flow produces a reduction in the valve chamber 53 slightly below the second reduction in the train line pressure.

Successive reductions of train line pressure will result in repeated movements of the kind described until the pressures within chamber 22 and auxiliary reservoir 34 are reduced to a point where the pressure within chamber 25' exactly equals said pressures, at which time the full braking force of the spring is being exerted. If the entire exhaustion necessary to operate the valves in a series of cars had to be made through an engineer's valve, the time required for the application of the brakes at the rear end of a long train would be dangerous because of the force of the oncoming of the unbraked cars at the rear end of the train acting against the braked cars at the front end of the train. This difficulty has, of course, been recognized by others and mechanism has been provided to obtain a local train line exhaust, the construction being such that the actuation of the brake controlling valve on the forward car will result in a local exhaust from the train line which thereupon causes the actuation of the next succeeding brake-controlling valve, where there is again a local train line exhaust which results in the actuation of the next succeeding brake controlling valve, etc. Such a construction is effective so far as speed of successive actuation of the valves is concerned, but the air locally exhausted from train line at each succeeding car ultimately passes to atmosphere and is wasted. In my present construction I have saved this waste, without reducing the speed of successive operation, in the following manner. Referring now to Fig. 4ª it will be noticed that pocket 117 is in register with passage 103 so that a communication is established from passage 93 through passage 103, pocket 117, passage 118, passage 111 and passage 101 with passage 95 and from thence to chamber 25', so that there is a movement locally from train line through the circuit mentioned into the spring chamber 25' where the air is saved to exert its braking power upon piston 21. By this arrangement I get all of the advantages of the local train line exhaust without, however, wasting the air so exhausted. Further reduction of train line pressure will thereupon cause a compression of spring 82 so that the parts will move to the positions shown in Figs. 6, 6ª and 6ᵇ. In this position valve 61 is moved so as to bring pocket 104 in position to connect passages 95 and 96 so that direct communication between auxiliary reservoir 34 and the spring chamber 25' is established and communication between auxiliary reservoir 34 and valve chamber 53 is cut off. At the same time passage 101 is brought into register with the exhaust passage 94 and passage 111 is in register with passage 101 so that valve chamber 53 exhausts to atmosphere and, chamber 22 being continuously in communication with valve chamber 53, the air in chamber 22 is exhausted to atmosphere so that all pressure opposing the spring pressure is withdrawn from piston 21 so that there is developed a braking force which is equal to the spring pressure plus the air pressure within chamber 25'. If the train line reduction at this time has been small, spring 82 will very soon drive the riding valve to the left so as to shift passage 111 out of register with passage 101 and thus arrest exhaust from chamber 22, there being the same flexibility of action during exhaust from chamber 22 as there was in permitting flow into chamber 25'. The operation up to this point is very similar to the operation of the structure shown in my previous patent except that in my previous structure, whenever there was a withdrawal of pressure from the air side of the brake piston 21 there was a loss of all of the air which had theretofore been available for opposing the spring pressure. In the present case, however, it will be noted that when chamber 22 is exhausted to atmosphere the pressure within auxiliary reservoir 34 is retained so that, as will appear later, the air within the auxiliary 34 becomes available to assist in refilling the chamber 22 in order to release the brakes.

A release of the brakes from first service application is obtained in the following manner. A slight increase in train line pressure will cause piston 57 to move to the left so as to connect passages 101 and 107, thus permitting an outflow from spring chamber 25' to atmosphere and thus reducing the braking pressure. At the same time, feed passage 115 will come into registry with passage 103 so that air may flow from train line into chamber 53 and from thence down through passage 121 into chamber 22 and also through passages 113 or 114 into passages 102 and 96 and thence into the auxiliary reservoir 34. This will continue until maximum pressure is attained in the auxiliary reservoir 34 and chamber 22 so as to result in a total although slow release of the brakes, but the engineer may stop this release at any time by a very slight train line reduction which will carry the parts to the position shown in Fig. 5.

A release from second service position Figs. 6, 6ª and 6ᵇ first shifts the riding valve 65 to the left until finger 66 engages finger 62 and then continues until valve 61 is moved to the left enough to bring passage 101 where it is just beginning to overlap passage 95 and to bring passage 102 where it is just beginning to overlap passage 96, and at this time passage 114 (Fig. 8ᴬ) is in register or partial register with passage 102. Thereupon there will be a flow of air from the auxiliary reservoir 34 through passages 96, 102 and 114 into valve chamber 53 and from thence down through passage 121 into chamber 22. The flow of air from the auxiliary reservoir into the valve chamber 53 will be at a pressure exceeding the train line pressure and the consequence is that almost immediately piston 57 will move back to the right until passage 111 of the riding valve begins to overlap passage 101 of the main valve which is in partial registry with passage 95, which is in communication with the spring chamber 25' and there will therefore be a back flow from spring chamber 25' into chamber 53 and from thence into chamber 22 so that, in the early stages of brake release, I transfer a material quantity of air from the spring chamber 25' back into chamber 22 from whence it originally came, instead of exhausting to atmosphere as I did in my previous constructions, thus effecting a material saving. Whenever the pressure within chamber 53 exceeds the train line pressure, piston 57 will move still farther to the right and thus stop flow from the spring chamber and auxiliary into chamber 22 thus giving the same flexibility of release that there is of application. Whenever the pressure within the spring chamber has been reduced to a point equal to the train line increase and there is then a further increase of train line pressure the riding valve will be carried to the position shown in Fig. 3 where communication is established, by pocket 116, between the spring chamber and atmosphere and between train line and the auxiliary reservoir and chamber 22 in the manner already described, thus resulting in a complete release and withdrawal of air pressure from the spring chamber.

When an emergency application is made the following operations take place. The engineer will throw his valve to emergency position, thus causing a quick and heavy reduction in train line pressure but, owing to the friction in the train line, this train line reduction is progressive in its nature toward the rear of the train. The first controlling valve to operate will be that on the first car and the first movement will be a movement of piston 57 to the first service position (Fig. 4) and, because this position is maintained and riding valve 65 is not oscillated as it would be in a service application, in the manner described, there will be practically an immediate equalization of pressures passing from auxiliary 34 and chamber 22 into the spring chamber 25' in the manner already described and, at the same time, a local, or accelerating, exhaust from the train line is established through passages 103, 117, 118, 111 and 101 into the spring chamber, thus serving to hasten the action of the next succeeding controlling valve to the rear. This local accelerating exhaust is fast enough to cause an actuation of the controlling valve of the next car to the rear before slack between the two cars is taken out, thus starting the setting of the brakes upon the second car before it can bump into the first car and before the brake is fully set upon the first car. Further reduction of train line pressure will cause a compression of spring 82 so that the piston 57 will move to the second service position where auxiliary 34 is directly connected to the spring chamber through pocket 104 and the auxiliary is blanked with respect to valve chamber 53 and at the same time, communication is established between valve chamber 53 (and hence chamber 22) with the atmosphere. The flow of air from chamber 22 to atmosphere at this time is not quite as rapid as the flow of air from the train line through the engineer's valve and consequently piston 57 does not remain in the second service position (Fig. 6) (although there may possibly be a slight hesitation at this time) but continues in its movement to the right, thus compressing spring 84 and unseating valve 87, the parts coming to the position shown in Fig. 7, train line pressure being thus locally exhausted to atmosphere through passages 89, 86 and 90 and a full registration of ports being established between chamber 22 and atmosphere through passages 111, 101 and 94.

In descending long grades it is desirable, although never before accomplished, so far as I am aware, to be able to maintain the brakes in set position while at the same time recharging the various reservoirs. In order to do this the engineer may, when the apparatus is in any one of its previously described positions, very suddenly increase the train line pressure to a point about 12 pounds above the pressure then existing in chamber 53 (which may be as low as atmosphere but will always be the then existing train line pressure) whereupon piston 57 will move to its extreme position to the left (Fig. 9) thus compressing springs 75 and 73 and bringing valves 65 and 61 to the positions shown in Figs. 9, 9ᵃ and 9ᵇ. Here passage 105 is brought into register with passage 95 but any communication between passage 105 and chamber 53 is blanked as is clearly apparent from Fig. 9. Passage 106, however, is brought into register with passage 93 so that air may flow directly from the train line through passages 43, 93, 106, 109, 105, 95, 38 and 37 into spring chamber 25'. At the same time passage 108 forms a communication between the train line passage 93 and valve chamber 53 so that air may pass from thence through passage 121 into chamber 22 and may pass from chamber 53 through passage 110 into passage 96 (with which passage 110 is in register) and from thence into auxiliary reservoir 34, so that the brakes may be held set while chambers 22 and 34 are being recharged to their full extent. It is true that the recharging of chamber 22 will cause a gradual reduction of the braking pressure because the pressure accumulating within chamber 22 will act in resistance to the spring pressure and the air pressure within chamber 25' but when this position of the parts is attained it is by reason of a direct connection between the main reservoir and the brake apparatus and, as is well known, the pressure carried within the main reservoir is very considerably greater than that ordinarily carried within the train line and the parts will be permitted to remain in the straight air position only long enough to permit accumulation within chambers 22 and 34 of the pressure of ordinary train line which is about 70 lbs. to the square inch, whereas the straight air pressure will be very considerably in excess of this. The consequence is that this gradual reduction of braking pressure in the straight air position is not particularly objectionable. It by no means outweighs the advantage which is gained by an ability to keep the brakes set during a recharging action. If, after recharging, it is still desired to keep the brakes set, the engineer will cause a reduction of train line pressure just sufficient to cause the piston 57 to move first to approximately the position shown in Fig. 4 whereupon straight air connections are disestablished and the parts will then automatically assume the position shown in Fig. 5.

My improved valve is applied to the "Westinghouse" or "New York" brake cylinder and auxiliary reservoir in the manner illustrated in Fig. 2. The brake cylinder 151 in which is mounted the usual brake piston 152 is urged to release position by means of a light spring 153. The air end 154 of the cylinder 151 is connected by a pipe 155 with passage 95 of my valve. The train line pipe 41 communicates, as before, with passages 91 and 93, and a pipe 156 connects the usual and standard auxiliary reservoir 157 with passage 96. The pipes 41, 155, and 156 are brought to a head 157 adapted to be connected to the main body 51 of my valve, said head being suitably ported to form the proper connections with the passages 95, 91, 93, and 96 but blanking the passage 121 of the valve structure thus throwing out of service this portion of the mechanism but not in any way interfering with the operation of the other parts.

The operation of the valve structure in this use is as follows: Referring to Figs. 3, 3$^a$ and 3$^b$, train line pressure will pass through passage 93 to passage 103 and thence through passage 115 into the valve chamber 53 and from thence through passages 114, 102 and 96 to pipe 156 and thence to the auxiliary reservoir 157. The service application of the brakes will be produced by a sufficient train line reduction to cause piston 57 to move to the position shown in Fig. 4 whereupon air passes from the auxiliary reservoir 157 through pipe 156 passages 96, 102, and 114, chamber 53 and thence through passages 111, 101 and 96 to pipe 155 and into the brake cylinder 154 so as to force piston 152 to braking position. Greater reduction of train line pressure will carry the piston 57 to the position shown in Fig. 6, at which time pocket 104 forms a direct communication between the auxiliary reservoir and the brake cylinder, through pipe 156, passage 96, 104 and 95, and pipe 155, and at the same time a registration of passages 111 and 101 with passage 94 permits an exhaustion of pressure from chamber 53 through passage 94 and therefore the piston 57 will, as soon as the pressure within chamber 53 is less than 6 lbs., be driven to the left by spring 82 until passage 111 is moved to the left out of registration with passage 101 if train line pressure has not been reduced below 6 lbs. It will be seen therefore that, at the time of this position of the valves, there is practically no pressure within chamber 53 so that a very slight increase of pressure in the train line will cause a movement of piston 57 to the left, so that a comparatively small increase in train line pressure will start the valves toward release or charging position.

After the brakes have been applied in the manner described (or before if desired) an application of brakes by straight air may be accomplished, in the manner already described, the engineer introducing into the train line a sufficient pressure from the main reservoir on the tender to drive piston 57 to the position shown in Fig. 9, whereupon straight air passes from the train line through passages 93, 109 95 and pipe 155 to the brake cylinder.

By proper control of the train line pressures, piston 57 may be reciprocated from straight air position to service position and back repeatedly so that the brakes may be maintained in braking position indefinitely so long as there is any air in the main reservoir and so long as the air pump will run. This is an operation which, so far as I am aware is absolutely novel in any automatically operating type of air brake construction.

In the present types now commonly in use difficulty is repeatedly experienced, where any attempt is made to keep the brakes set for a considerable period, by reason of leakage of air from the brake cylinders and consequent exhaustion of air from the auxiliary reservoirs, and the auxiliary reservoirs cannot be recharged without a total release of braking pressures.

Referring again to the operation of my improved valve, wholly irrespective of whether it be applied to my improved type of brake, as illustrated in my above mentioned patents, or applied to the "Westinghouse" or "New York" brakes, I desire to call attention to a peculiarity of action of the valve mechanism by means of which an engineer will be able, with the ordinary and normal operation of the engineer's valve, to release the brakes in a forwardly progressive order, i. e., beginning at the rear car. This is important in the handling of long trains because, if, after all of the brakes have been set, the forward brakes be released first, the pull exerted by the rear cars which still have their brakes set hard, will almost inevitably result in a pulling apart of the train. Supposing now that a long train be equipped with my improved valve mechanism and that there has been an application of the brakes, the release of the brakes will be accomplished by the engineer throwing his valve to the full release position. This will establish a direct and large connection between the main reservoir and the train line. Air at high pressure will rush into the train line from the main reservoir and when it reaches the valve mechanism of the first car the pressure upon the right hand end of piston 57 will be great enough to carry said piston quickly to the straight air position (Fig. 9) thus retaining the brakes set upon the first car. The valve mechanisms of succeeding cars will be similarly affected, the pressure upon the right hand end of the piston 57 gradually decreasing from car to car toward the rear, until toward the end of the train, in a long train, two or three cars in advance of the caboose, the pressure upon the right hand end of piston 57 will not be sufficient to cause a compression of spring 72 but will be sufficient to compress spring 75 so that the riding valve 65, instead of stopping where there is a full registration between the passage 95 and passage 94 will pass on to the position shown in Fig. 8 where passage 107 is considerably throttled so that the release of brake applying air from the brake cylinder will be gradual. Upon the cars still farther to the rear the effect of the train line pressure increase upon the piston 57 will be still less so that the valve mechanism of the last car will have its piston 57 stop when stem 58 engages the abutment 74 and in this position there is a full registration between the brake applying air in the brake cylinder and the exhaust passage 94 (Fig. 3) and there will be a rapid release of the brake upon the very last car.

Proceeding now forwardly it will be found that springs 72 and 75 will cause a shifting of the valves to bring them to the full release (or charge) position in forward succession because air from the train line will be passing into the valve chamber 53 through passages 93, 106, and 108 tending to equalize the pressure upon the opposite side of piston 57 and, as in the rear cars the pressures upon the right hand sides of pistons 57 were gradually less toward the rear of the train, the cars toward the rear will be the first to equalize upon opposite sides of piston 57. This condition will occur whether the engineer keeps his valve in the full release position or not, although, in practice, the engineer will throw his valve to running position as soon as he has had his valve in full release position long enough to secure the release of the brakes of the last car. Such actuation of the engineer's valve will hasten the release of the brakes in the cars but will not change the order of release. It is to be recalled, in this connection, that if the engineer desires to keep the brakes set after he has passed to the straight air position, he must, by the time there has been a complete recharging, carry his valve to service position in order to move the valve to service position.

I claim as my invention:—

1. In an air brake, the combination, with a brake cylinder and its piston, a train-line connection, an auxiliary reservoir, and connections between the train-line, brake cylinder and auxiliary reservoir, of a controlling-valve mechanism controlling the connections between the train-line, auxiliary reservoir and brake cylinder whereby the brake cylinder may be connected with train-line or with the auxiliary reservoir, and train-line may be connected with the auxiliary reservoir, and a valve-operating member connected with said valve mechanism and subjected to train-line pressure whereby variations in train-line pressure will produce movements of the valve mechanism to cause a flow of air either from the auxiliary reservoir relative to the brake cylinder to cause a brake application, or from train-line to the brake cylinder and to the auxiliary reservoir to cause a brake application and a recharging of the auxiliary reservoir.

2. In an air brake, the combination, with a brake cylinder and its piston, an auxiliary reservoir, a train-line connection and connection between the train-line, brake cylinder and auxiliary reservoir, of a controlling-valve mechanism controlling the connections between the train-line, auxiliary reservoir and brake cylinder, whereby the train-line may be connected with the brake cylinder and the auxiliary reservoir by an increase of train-line pressure, and train-line may be connected with the auxiliary reservoir, and the auxiliary reservoir may be connected with the brake cylinder, and means for moving said controlling-valve mechanism.

3. In an air brake, the combination, with a brake cylinder and its piston, an auxiliary reservoir, a train-line connection, and connections between the train-line, brake cylinder and auxiliary reservoir, of a controlling-valve mechanism controlling the connections between the train-line, auxiliary reservoir and brake cylinder, whereby the train-line may be connected with the brake cylinder and the auxiliary reservoir, and the train-line may be connected with the auxiliary reservoir, and the local reservoir may be connected with the brake cylinder and means for moving said controlling-valve mechanism to connect the brake cylinder with either the auxiliary reservoir or train-line, and to establish a connection between train-line and auxiliary reservoir when train-line is connected with the brake cylinder.

4. An air-brake controlling-valve comprising; a main body having, a piston chamber, a train-line connection with one end of said piston chamber, a valve chamber, a train-line connection with said valve chamber, a brake-cylinder passage, an auxiliary-reservoir passage, and an atmosphere passage communicating with the valve chamber; a piston mounted in the piston chamber; and valve mechanism mounted within the valve chamber and connected with the piston, said valve mechanism being so formed as to connect train-line with the auxiliary reservoir passage, and to connect train-line with the brake-cylinder passage, and to connect train-line with the valve chamber, and to connect the auxiliary reservoir with the brake cylinder, and to connect brake cylinder with atmosphere, and to connect the valve chamber with atmosphere.

5. An air-brake controlling-valve comprising; a main body having, a piston chamber, a train-line connection with one end of said piston chamber, a valve chamber, a train-line connection with said valve chamber, a brake-cylinder passage, an auxiliary-reservoir passage, an atmosphere passage communicating with the valve chamber, and a passage for establishing communication between the valve chamber and the brake cylinder upon the opposite side of the brake piston to which the first mentioned brake-cylinder passage leads; a piston mounted in the piston chamber; and valve mechanism mounted within the valve chamber and connected with the piston, said valve mechanism being so formed as to connect train-line with the auxiliary reservoir passage, and to connect train-line with the first-mentioned brake-cylinder passage, and to connect train-line with the valve chamber, and to connect the auxiliary reservoir with the brake cylinder, and to connect brake cylinder with atmosphere, and to connect the valve chamber with atmosphere.

6. An air-brake controlling-valve comprising; a main body having, a piston chamber, a train-line connection with one end of said piston chamber, a valve chamber, a train-line connection with said valve chamber, a brake-cylinder passage, an auxiliary-reservoir passage, and an atmosphere passage communicating with the valve chamber; a piston mounted in the piston chamber; a valve mechanism mounted within the valve chamber and connected with the piston, said valve mechanism being so formed as to connect train-line with the auxiliary reservoir passage, and to connect train-line with the brake-cylinder passage, and to connect train-line with the valve chamber, and to connect the auxiliary reservoir with the brake cylinder, and to connect brake cylinder with atmosphere, and to connect the valve chamber with atmosphere; and means for yieldingly restraining movement of the piston at intermediate points in its possible movement.

7. An air-brake controlling-valve comprising; a main body having, a piston chamber, a train-line connection with one end of said piston chamber, a valve chamber, a train-line connection with said valve chamber, a brake-cylinder passage, an auxiliary-reservoir passage, an atmosphere passage communicating with the valve chamber, a passage for establishing communication between the valve chamber and the brake cylinder upon the opposite side of the brake piston to which the first mentioned brake-cylinder passage leads; a piston mounted in the piston chamber; and valve mechanism mounted within the valve chamber and connected with the piston, said valve mechanism being so formed as to connect train-line with the local reservoir passage, and to connect train-line with the first-mentioned brake-cylinder passage, and to connect train-line with the valve chamber, and to connect the auxiliary reservoir with the brake-cylinder, and to connect brake cylinder with atmosphere, and to connect the valve chamber with atmosphere; and means for yieldingly restraining movement of the piston at intermediate points in its possible movement.

8. A controlling valve for air brakes comprising; a main body, having a piston chamber, a valve chamber, a train-line passage communicating with the piston chamber, a train-line passage communicating with the valve chamber, and three passages communicating with the valve chamber and adapted to establish communication respectively with a brake cylinder, an auxiliary reservoir, and atmosphere; a piston mounted in the piston chamber; valve mechanism connected with the piston and coöperating with the passages communicating with the valve chamber in such manner as to establish and disestablish connections between train-line and valve chamber, between train-line and the brake-cylinder passage and auxiliary reservoir passage by increase of train-line pressure, between auxiliary-reservoir passage and the said brake-cylinder passage, and between brake-cylinder passage and atmosphere passage; and a spring abutment for yieldingly limiting the movement of the piston in one direction.

9. A controlling valve for air brakes comprising; a main body, having a piston chamber, a valve chamber, a train-line passage communicating with the piston chamber, a train-line passage communicating with the valve chamber, three passages communicating with the valve chamber and adapted to establish communication respectively with a brake cylinder, an auxiliary reservoir, and atmosphere, and a second brake-cylinder passage communicating with the valve chamber; a piston mounted in the piston chamber; valve mechanism connected with the piston and coöperating with the passages communicating with the valve chamber in such manner as to establish and disestablish connections between train-line and valve chamber, between train-line and the first-mentioned brake-cylinder passage, between auxiliary-reservoir passage and the said first-mentioned brake-cylinder passage, and between brake-cylinder passage and atmosphere passage; and a spring abutment for yieldingly limiting the movement of the piston in one direction.

10. A controlling valve for air brakes comprising; a main body, having a piston chamber, a valve chamber, a train-line passage communicating with the piston chamber, a train-line passage communicating with the valve chamber, and three passages communicating with the valve chamber and adapted to establish communication respectively with a brake cylinder, an auxiliary reservoir, and atmosphere; a piston mounted in the piston chamber; valve mechanism connected with the piston and coöperating with the passages communicating with the valve chamber in such manner as to establish and disestablish connections between train-line and valve chamber, between train-line and the brake-cylinder passage, between auxiliary-reservoir passage and the said brake-cylinder passage, and between brake-cylinder passage and atmosphere passage; a spring abutment for yieldingly limiting the movement of the piston in one direction; a pair of differentiated spring abutments for limiting the movement of the piston in the opposite direction; a valve controlling a local exhaust between the first-mentioned train-line passage and atmosphere; means connected with said valve for engagement by said piston in its movement in said direction; and a spring holding said local exhaust valve to its seat by a pressure exceeding the pressure of the said spring abutment.

11. A controlling valve for air brakes comprising; a main body, having a piston chamber, a valve chamber, a train-line passage communicating with the piston chamber, a train-line passage communicating with the valve chamber, three passages communicating with the valve chamber and adapted to establish communication respectively with a brake cylinder, an auxiliary reservoir, and atmosphere, and a second brake-cylinder passage communicating with the valve chamber; a piston mounted in the piston chamber; valve mechanism connected with the piston and coöperating with the passages communicating with the valve chamber in such manner as to establish and disestablish connections between train-line and valve chamber, between train-line and the first-mentioned brake-cylinder passage, between auxiliary-reservoir passage and the said first-mentioned brake-cylinder passage, and between brake-cylinder passage and atmosphere passage; a spring abutment for yieldingly limiting the movement of the piston in one direction; a pair of differentiated spring abutments for limiting the movement of the piston in the opposite direction; a valve controlling a local exhaust between the first-mentioned train-line passage and atmosphere; means connected with said valve for engagement by said piston in its movement in said direction; and a spring holding said local exhaust valve to its seat by a pressure exceeding the pressure of the said spring abutment.

12. A brake-controlling valve comprising, a piston cylinder, a train-line connection with one end of said cylinder, a valve chamber connecting with the opposite end of said cylinder, and valve mechanism mounted in said chamber and connected to said piston, the main body and the valve mechanism having coöperating passages which, upon registry, will connect the valve chamber with atmosphere whereby comparatively small increase of pressure in the train-line will actuate the valve mechanism.

13. In a brake mechanism, the combination, of a brake cylinder, a brake piston mounted therein, an air chamber communicating with one end of the brake cylinder, a brake-applying spring acting upon the brake piston, a controlling valve comprising passages and valve mechanism through which may be established communication between train-line and the brake cylinder, and between the brake cylinder and the air chamber, and between said brake cylinder and air chamber and atmosphere, the communication between the brake cylinder and the air chamber being established both upon the brake-applying movement of the valve mechanism and also upon the brake-releasing movement of the valve mechanism, whereby air will be transferred from the brake cylinder to the air chamber to furnish brake-applying air pressure, and a part of said air will be re-transferred from the air chamber to the brake cylinder to furnish brake-releasing air pressure.

14. In a brake mechanism, the combination, of a brake cylinder, a brake piston mounted therein, an air chamber communicating with one end of the brake cylinder, a brake-applying spring acting upon the brake piston, a controlling valve comprising passages and valve mechanism through which may be established communication between train-line and the brake cylinder, and between train-line and the air chamber, and between the brake cylinder and the air chamber, and between said brake cylinder and air chamber and atmosphere, the communication between the brake cylinder and the air chamber being established both upon the brake-applying movement of the valve mechanism and also upon the brake-releasing movement of the valve mechanism, whereby air will be transferred from the brake cylinder to the air chamber to furnish brake-applying air pressure, and a part of said air will be re-transferred from the air chamber to the brake cylinder to furnish brake-releasing air pressure.

15. In a brake mechanism, the combination, of a brake cylinder, a brake piston mounted therein, an air chamber communicating with one end of the brake cylinder, an auxiliary reservoir, a brake-applying spring acting upon the brake piston, and a controlling valve comprising passages and valve mechanism through which may be established communication between train-line and the brake cylinder and the auxiliary reservoir, and between the brake cylinder and auxiliary reservoir and the air chamber, and between said brake cylinder and air chamber and atmosphere.

16. In a brake mechanism, the combination, of a brake cylinder, a brake piston mounted therein, an air chamber communicating with one end of the brake cylinder, an auxiliary reservoir, a brake-applying spring acting upon the brake piston, and a controlling valve comprising passages and valve mechanism through which may be established communication between train-line and the brake cylinder and the auxiliary reservoir, and between train-line and the air chamber, and between the brake cylinder and auxiliary reservoir and the air chamber, and between said brake cylinder and air chamber and atmosphere.

17. In a brake mechanism, the combination, of a brake cylinder, a brake piston mounted therein, an air chamber communicating with one end of the brake cylinder, an auxiliary reservoir, a brake-applying spring acting upon the brake piston, and a controlling valve comprising passages and valve mechanism through which may be established communication between train-line and the brake cylinder and the auxiliary reservoir, and between the brake cylinder and auxiliary reservoir and the air chamber, and between said brake cylinder and air chamber and atmosphere, the communication between the brake cylinder and the air chamber being established both upon the brake-applying movement of the valve mechanism and upon the brake-releasing movement of the valve mechanism, whereby air will be transferred from the brake cylinder to the air chamber to furnish brake-applying air pressure, and a part of said air will be re-transferred from the air chamber to the brake cylinder to furnish brake-releasing air pressure.

18. In a brake mechanism, the combination, of a brake cylinder, a brake piston mounted therein, an air chamber communicating with one end of the brake cylinder, an auxiliary reservoir, a brake-applying spring acting upon the brake piston, and a controlling valve comprising passages and valve mechanism through which may be established communication between train-line and the brake cylinder and the auxiliary reservoir, and between train-line and the air chamber, and between the brake cylinder and auxiliary reservoir and the air chamber, and between said brake cylinder and air chamber and atmosphere, the communication between the brake cylinder and the air chamber being established both upon the brake-applying movement of the valve mechanism and upon the brake-releasing movement of the valve mechanism, whereby air will be transferred from the brake cylinder to the air chamber to furnish brake-applying air pressure, and a part of said air will be re-transferred from the air chamber to the brake cylinder to furnish brake-releasing air pressure.

19. In a brake mechanism, the combination, of a brake cylinder, a brake piston mounted therein, an air chamber communicating with one end of the brake cylinder, a brake-applying spring acting upon the brake piston, a controlling valve comprising passages and valve mechanism through which may be established communication between train-line and the brake cylinder, and between the brake cylinder and the air chamber, and between said brake cylinder and air chamber and atmosphere, the communication between the brake cylinder and the air chamber being established both upon the brake-applying movement of the valve mechanism and also upon the brake-releasing movement of the valve mechanism, whereby air will be transferred from the brake cylinder to the air chamber to furnish brake-applying air pressure, and a part of said air will be re-transferred from the air chamber to the brake cylinder to furnish brake-releasing air pressure, said controlling valve also comprising a piston chamber communicating with train-line, and a piston mounted in said piston chamber and connected to the valve mechanism to operate the same.

20. In a brake mechanism, the combination, of a brake cylinder, a brake piston mounted therein, an air chamber communicating with one end of the brake cylinder, a brake-applying spring acting upon the brake piston, a controlling valve comprising passages and valve mechanism through which may be established communication between train-line and the brake cylinder, and between train-line and the air chamber, and between the brake cylinder and the air chamber, and between said brake cylinder and air chamber and atmosphere, the communication between the brake cylinder and the air chamber being established both upon the brake-applying movement of the valve mechanism and also upon the brake-releasing movement of the valve mechanism, whereby air will be transferred from the brake cylinder to the air chamber to furnish brake-applying air pressure, and a part of said air will be re-transferred from the air chamber to the brake cylinder to furnish brake-releasing air pressure, said controlling valve also comprising a piston chamber communicating with train-line, and a piston mounted in said piston chamber and connected to the valve mechanism to operate the same.

21. In a brake mechanism, the combination, of a brake cylinder, a brake piston mounted therein, an air chamber communicating with one end of the brake cylinder, an auxiliary reservoir, a brake-applying spring acting upon the brake piston, a controlling valve comprising passages and valve mechanism through which may be established communication between train-line and the brake-cylinder and the auxiliary reservoir, and between the brake cylinder and auxiliary reservoir and the air chamber, and between said brake cylinder and air chamber and atmosphere, said controlling valve also comprising a piston chamber communicating with train-line, and a piston mounted in said piston chamber and connected to the valve mechanism to operate the same.

22. In a brake mechanism, the combination, of a brake cylinder, a brake piston mounted therein, an air chamber communicating with one end of the brake cylinder, an auxiliary reservoir, a brake-applying spring acting upon the brake piston, a controlling valve comprising passages and valve mechanism through which may be established communication between train-line and the brake cylinder and the auxiliary reservoir, and between train-line and the air chamber, and between the brake cylinder and auxiliary reservoir and the air chamber, and between said brake cylinder and air chamber and atmosphere, said controlling valve also comprising a piston chamber communicating with train-line, and a piston mounted in said piston chamber and connected to the valve mechanism to operate the same.

23. In a brake mechanism, the combination, of a brake cylinder, a brake piston mounted therein, an air chamber communicating with one end of the brake cylinder, an auxiliary reservoir, a brake-applying spring acting upon the brake piston, a controlling valve comprising passages and valve mechanism through which may be established communication between train-line and the brake cylinder and the auxiliary reservoir, and between the brake cylinder and auxiliary reservoir and the air chamber, and between said brake cylinder and air chamber and atmosphere, the communication between the brake cylinder and the air chamber being established both upon the brake-applying movement of the valve mechanism and upon the brake-releasing movement of the valve mechanism, whereby air will be transferred from the brake cylinder to the air chamber to furnish brake-applying air pressure, and a part of said air will be re-transferred from the air chamber to the brake cylinder to furnish brake-releasing air pressure, said controlling valve also comprising a piston chamber communicating with train-line, and a piston mounted in said piston chamber and connected to the valve mechanism to operate the same.

24. In a brake mechanism, the combination, of a brake cylinder, a brake piston mounted therein, an air chamber communicating with one end of the brake cylinder, an auxiliary reservoir, a brake-applying spring acting upon the brake piston, a controlling valve comprising passages and valve mechanism through which may be established communication between train-line and the brake cylinder and the auxiliary reservoir, and between train-line and the air chamber, and between the brake cylinder and auxiliary reservoir and the air chamber, and between said brake cylinder and air chamber and atmosphere, the communication between the brake cylinder and the air chamber being established both upon the brake-applying movement of the valve mechanism and upon the brake-releasing movement of the valve mechanism, whereby air will be transferred from the brake cylinder to the air chamber to furnish brake-applying air pressure, and a part of said air will be re-transferred from the air chamber to the brake cylinder to furnish brake-releasing air pressure, said controlling valve also comprising a piston chamber communicating with train-line, and a piston mounted in said piston chamber and connected to the valve mechanism to operate the same.

25. An air brake comprising a main cylinder, an annular head closing one end of said cylinder and carrying a spring chamber communicating with one end of the brake cylinder, a piston mounted in the brake cylinder, a spring mounted in the spring chamber and engaging the piston to drive the same in brake-applying direction, and a cylinder sleeved over the spring chamber and forming therewith an annular auxiliary reservoir, suitable passages giving ingress and egress to and from the brake cylinder, the spring chamber and the auxiliary reservoir, substantially as and for the purpose described.

26. A controlling valve for air brakes comprising, a main body, having formed therein, a piston chamber, a valve chamber communicating with one end of said piston chamber, a train-line passage communicating with the opposite end of said piston chamber, a checked train-line passage leading into the valve chamber, and the following passages communicating with the valve chamber, to-wit;—a brake cylinder passage, an auxiliary reservoir passage, a valve-operating piston mounted in the piston chamber; a main valve mounted in the valve chamber and comprising the passages, 101, 102, 103, 104, 105, 106, 107, 108, 109 and 110; a riding valve coöperating with the main valve and connected to the piston, said riding valve comprising the passages, 111, 112, 113, 114, 115, 116, 117 and 118.

27. A controlling valve for air brakes comprising, a main body, having formed therein, a piston chamber, a valve chamber communicating with one end of said piston chamber, a train-line passage communicating with the opposite end of said piston chamber, a checked train-line passage leading into the valve chamber, and the following passages communicating with the valve chamber, to-wit;—a brake-cylinder passage, an auxiliary-reservoir passage, an atmosphere passage, and a second brake cylinder passage; a valve-operating piston mounted in the piston chamber; a main valve mounted in the valve chamber and comprising the passages, 101, 102, 103, 104, 105, 106, 107, 108, 109, and 110; a riding valve coöperating with the main valve and connected to the piston, said riding valve comprising the passages, 111, 112, 113, 114, 115, 116, 117 and 118.

28. A controlling valve for air brakes comprising, a main body, having formed therein, a piston chamber, a valve chamber communicating with one end of said piston chamber, a train-line passage communicating with the opposite end of said piston chamber, a checked train-line passage leading into the valve chamber, and the following passages communicating with the valve chamber, to-wit;—a brake-cylinder passage, an auxiliary-reservoir passage, an atmosphere passage; a valve-operating piston mounted in the piston chamber; a main valve mounted in the valve chamber and comprising the passages, 101, 102, 103, 104, 105, 106, 107, 108, 109, and 110; a riding valve coöperating with the main valve and connected to the piston, said riding valve comprising the passages, 111, 112, 113, 114, 115, 116, 117 and 118; a spring abutment to limit the movement of the riding valve in one direction, a second stronger spring abutment acting in the same direction as the first-mentioned spring abutment to yieldingly limit the movement of the two valves; and a spring abutment to yieldingly limit the movement of said valves in the opposite direction.

29. A controlling valve for air brakes comprising, a main body, having formed therein, a piston chamber, a valve chamber communicating with one end of said piston chamber, a train-line passage communicating with the opposite end of said piston chamber, a checked train-line passage leading into the valve chamber, and the following passages communicating with the valve chamber, to-wit;—a brake-cylinder passage, an auxiliary-reservoir passage, an atmosphere passage, and a second brake cylinder passage; a valve-operating piston mounted in the piston chamber; a main valve mounted in the valve chamber and comprising the passages, 101, 102, 103, 104, 105, 106, 107, 108, 109 and 110; a riding valve coöperating with the main valve and connected to the piston, said riding valve comprising the passages 111, 112, 113, 114, 115, 116, 117, and 118; a spring abutment to limit the movement of the riding valve in one direction, a second stronger spring abutment acting in the same direction as the first-mentioned spring abutment to yieldingly limit the movement of the two valves; and a spring abutment to yieldingly limit the movement of said valves in the opposite direction.

30. A controlling valve for air brakes comprising, a main body, having formed therein, a piston chamber, a valve chamber communicating with one end of said piston chamber, a train-line passage communicating with the opposite end of said piston chamber, a checked train-line passage leading into the valve chamber, and the following passages communicating with the valve chamber, to-wit;—a brake-cylinder passage, an auxiliary-reservoir passage, an atmosphere passage; a valve-operating piston mounted in the piston chamber; a main valve mounted in the valve chamber and comprising the passages, 101, 102, 103, 104, 105, 106, 107, 108, 109 and 110; a riding valve coöperating with the main valve and connected to the piston, said riding valve comprising the passages, 111, 112, 113, 114, 115, 116, 117 and 118; a spring abutment to limit the movement of the riding valve in one direction, a second stronger spring abutment acting in the same direction as the first-mentioned spring abutment to yieldingly limit the movement of the two valves; a spring abutment to yieldingly limit the movement of said valves in the opposite direction; a local train-line exhaust valve, and a spring abutment connected with said exhaust valve and stronger than the last mentioned spring abutment to further yieldingly limit the movement of the valves in the last mentioned direction, all substantially as and for the purpose set forth.

31. A controlling valve for air brakes comprising, a main body, having formed therein, a piston chamber, a valve chamber communicating with one end of said piston chamber, a train-line passage communicating with one end of said piston chamber, a checked train-line passage leading into the valve chamber, and the following passages communicating with the valve chamber, to-wit;—a brake-cylinder passage, an auxiliary-reservoir passage, an atmosphere passage, and a second brake-cylinder passage; a valve-operating piston mounted in the piston chamber; a main valve mounted in the valve chamber and comprising the passages, 101, 102, 103, 104, 105, 106, 107, 108, 109 and 110; a riding valve coöperating with the main valve and connected to the piston, said riding valve comprising the passages 111, 112, 113, 114, 115, 116, 117 and 118; a spring abutment to limit the movement of the riding valve in one direction, a second stronger spring abutment acting in the same direction as the first-mentioned spring abutment to yieldingly limit the movement of the two valves; a spring abutment to yieldingly limit the movement of said valves in the opposite direction; a local train-line exhaust valve, and a spring abutment connected with said exhaust valve and stronger than the last-mentioned spring abutment to further yieldingly limit the movement of the valves in the last-mentioned direction, all substantially as and for the purpose set forth.

32. An air brake controlling valve comprising, a main body and movable valve mechanism therein, said main body and movable valve mechanism having coöperating passages by means of which communication may be established between a brake cylinder and an auxiliary reservoir, between train-line and a brake cylinder and auxiliary reservoir, and between train-line and the auxiliary reservoir, and means for shifting said valve mechanism whereby brakes may be applied by reason of flow of air either from the auxiliary reservoir or from train-line.

33. An air brake controlling valve comprising, a main body and movable valve mechanism therein, said main body and movable valve mechanism having coöperating passages by means of which communication may be established between train line and a brake cylinder and an auxiliary reservoir, between a brake cylinder and auxiliary reservoir, and between train-line and the auxiliary reservoir, and means for shifting said valve mechanism whereby brakes may be applied by reason of flow of air either from the auxiliary reservoir or from train-line, said shifting means comprising a piston subjected upon one side to train-line pressure and upon the other side to valve chamber pressure.

34. In an air brake, the combination with the brake cylinder and its piston, the train line, the auxiliary reservoir, of a controlling valve mechanism comprising a valve-operating member subjected upon one side to train-line pressure and upon the opposite side to pressure from the auxiliary reservoir, and valve mechanism controlled by said valve-controlling member for establishing either a communication between the auxiliary reservoir and the brake cylinder, or a communication between the train-line and the brake cylinder and auxiliary reservoir, whereby the brake cylinder may be supplied with brake-applying air either from the auxiliary reservoir or from train-line and the auxiliary reservoir recharged.

35. In an air brake, the combination with the brake cylinder and its piston, a brake-applying spring acting upon the piston to drive the same to brake-applying position, an auxiliary reservoir, the train-line, and a main reservoir, of a controlling valve comprising a valve-controlling member subjected upon one side to train-line pressure and upon the other side to auxiliary reservoir pressure, and valve mechanism controlled by said valve controlling member for modifying the local reservoir pressure relative to the piston, or for introducing pressure direct from the train-line to said piston to supplement the spring.

36. In an air brake, the combination with the brake cylinder and its piston, a brake-applying spring acting upon the piston to drive the same to brake-applying position, an auxiliary reservoir, the train-line, and a main reservoir, of a controlling valve comprising a valve-controlling member subjected upon one side to train-line pressure and upon the other side to auxiliary reservoir pressure, and valve mechanism controlled by said valve controlling member for modifying the local reservoir pressure relative to the piston by transferring a part thereof to act upon the piston in brake-applying direction, or for introducing pressure direct from the train-line to said piston to supplement the spring.

In witness whereof, I, have hereunto set my hand and seal at Indianapolis, Indiana, this 26th day of March, A. D. one thousand nine hundred and nine.

AUGUSTUS A. ST. CLAIR. [L. S.]

Witnesses:
ARTHUR M. HOOD,
THOMAS W. MCMEANS.